United States Patent [19]

Marrié

[11] 3,975,998

[45] Aug. 24, 1976

[54] PANCAKE MAKING MACHINE

[75] Inventor: Paul Marrié, Dijon, France

[73] Assignee: S.A.R.L. "ETUD", Quetigny, France

[22] Filed: June 3, 1975

[21] Appl. No.: 583,263

Related U.S. Application Data

[60] Continuation of Ser. No. 461,109, April 15, 1974, abandoned, which is a division of Ser. No. 241,309, April 5, 1972, Pat. No. 3,853,045.

[30] Foreign Application Priority Data

| | | |
|---|---|---|
| Apr. 7, 1971 | France | 71.12242 |
| July 5, 1971 | France | 71.24434 |
| Feb. 25, 1972 | France | 72 06409 |

[52] U.S. Cl. ...................................... 99/423; 99/335

[51] Int. Cl.$^2$ ........................ A47J 37/06; A21B 5/00

[58] Field of Search ...................... 99/423, 335, 450; 74/426, 434; 219/469–471, 501–505; 15/256.51, 256.53

[56] References Cited

UNITED STATES PATENTS

| | | | |
|---|---|---|---|
| 3,489,106 | 1/1970 | Lostanlen | 99/423 |
| 3,498,210 | 3/1970 | O'Toole | 99/450 X |
| 3,543,694 | 12/1970 | Tanguy et al. | 99/335 |
| 3,630,140 | 12/1971 | Marrie | 99/423 |

*Primary Examiner*—Stanley N. Gilreath
*Assistant Examiner*—Arthur O. Henderson
*Attorney, Agent, or Firm*—Karl F. Ross; Herbert Dubno

[57] ABSTRACT

A pancake-making machine (for baking French-type pancakes or "crepes") has a drum rotatable by a drive motor via heat-resistant synthetic-resin gears on its ends. A transfer roller carried on a batter trough is displaceable toward and away from the drum by a handle which controls the drive motor to arrest both the drum and the transfer roller when the two are pulled apart. The transfer roller forms a layer of batter on the drum which is heated by an internal electric heating element supplied with current through axially extending copper sleeves at its ends. The handle is a bent wire pivoted at each end in a slot in the machine housing and latchingly engageable against the displaceable trough. A thermistor imbedded in the drum adjacent the surface thereof is connected via an electronic circuit to a triac in series with the heating element to control the drum heating. A wire stretched tight between two support arms serves to strip the baked pancake from the drum.

1 Claim, 17 Drawing Figures

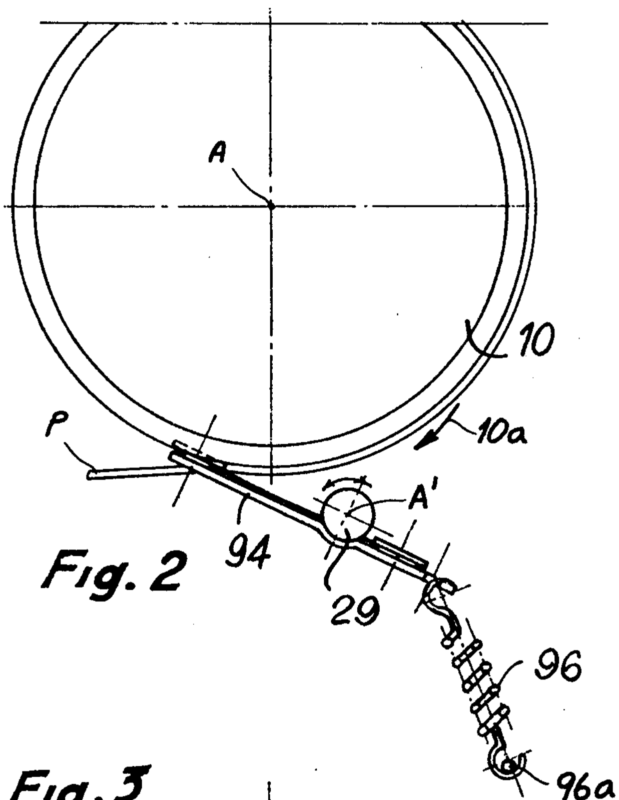
Fig. 2
Fig. 3
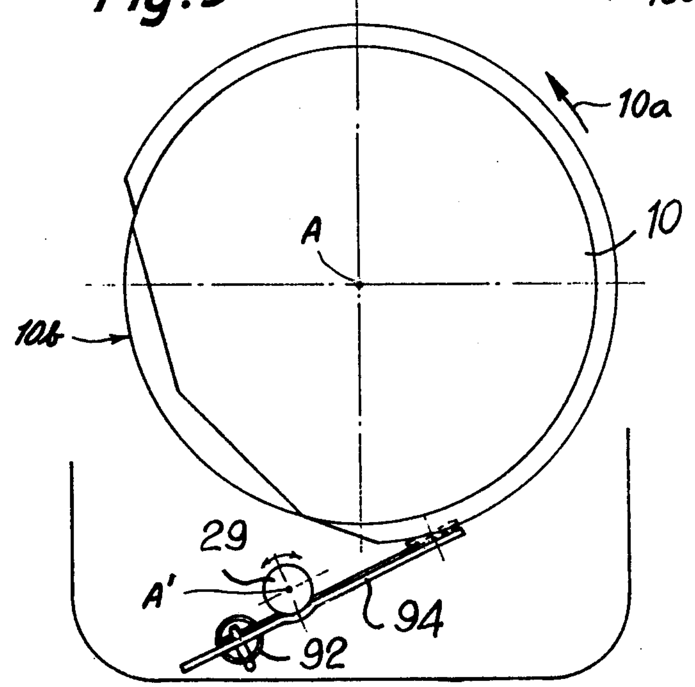

PANCAKE MAKING MACHINE

This is a continuation of application Ser. No. 461,109, filed Apr. 15, 1974, abandoned, as a division of application Ser. No. 241,309 filed Apr. 5, 1972, now U.S. Pat. No. 3,853,045.

FIELD OF THE INVENTION

The present invention relates to a pancake-making machine. More particularly this invention concerns an apparatus for the serial productions of pancakes of the "crepe" type or of French style.

BACKGROUND OF THE INVENTION

In my U.S. Pat. No. 3,630,140 issued Dec. 28, 1971 there is described a pancake-making machine having a heatable drum mounted for rotation about a horizontal axis and, closely juxtaposed therewith, a similarly mounted transfer roller having access to a supply of batter for spreading same over the periphery surface of the rotating drum; this peripheral surface is uniformly cylindrical except for an axially extending recess, or possibly several equispaced recesses, generally subtending only a minor fraction (e.g. about a quadrant) of the drum circumference. With the drum and the roller codirectionally driven, and with the peripheral roller speed at least equal to but preferably somewhat higher than the peripheral drum speed, the batter picked up by the roller is transferred to the drum as a continuous layer until the leading edge of the recess confronts the roller. At this point, the normally narrow gap between the drum and the roller suddenly widens so that the batter adhering to the roller surface no longer reaches the drum but is returned to the trough from which it was taken, the transfer roller advantageously dipping directly into this trough in which the level of the batter is held substantially constant in a manner more fully described hereinafter.

For the most effective transfer in the case of a roller partly submerged in the batter supply, this roller should be positioned next to the lower quadrant of the drum on the ascending side thereof. The hot layer of cooked dough adhering to the drum surface is then stripped off, preferably at or near the nadir of the drum, by a scraper which may comprise a blade resiliently biased thereagainst. The layer so removed may drop onto downwardly sloping transport means such as a chute or a conveyor carrying it, if desired, onto another heated surface for the baking of the hitherto exposed side of the pancake.

OBJECTS OF THE INVENTION

It is an object of the present invention to improve upon the machine of my prior patent.

Another object is to provide an apparatus of the above-described type which has increased isolation of the batter pan from the cooking drum and an improved heating system for this drum.

SUMMARY OF THE INVENTION

These objects are attained according to the present invention by an apparatus of the above-described type wherein the pancake or crepe is removed from the cooking drum by a thin stainless-steel wire which is stretched between two supports and is urged against the surface of the drum. Such a wire conducts only a fraction of the heat carried away by the paddle or scraper previously employed.

According to another feature of the invention the entire batter pan with its batter supply and transfer roller can be displaced toward and away from the cooking drum in order to withdraw these elements from the source of heat during, for example, a period when there is no immediate need for pancakes but when an imminent need would require the heat to be left on. In accordance with yet another feature of the invention the drive motor for the cooking drum and transfer roller is operated by the mechanism serving to displace the supply tray to stop rotation of the drum and roller when these two elements are drawn apart. Thus a batter layer may be formed on the drum, whereupon the transfer roller is withdrawn while the batter cooks to form the pancake.

Yet another feature of the present invention requires that the cooking drum be provided at at least one end with a drive gear made of a thermosetting, heat-resistant synthetic resin formed on a sheet-metal base. In this manner there is surprisingly little heat conduction out through the cooking-drum drive.

The apparatus, according to another feature of the invention, is provided with a warming rack in the form of an open screen held on a frame above the cooking drum. Completed pancakes can be stacked on this screen to hold them warm until they are called for.

Finally, a heating arrangement is provided including a resistance element imbedded in the surface of the cooking drum. A thermostatic body, preferably a thermistor, is also imbedded in the drum just below its surface. The drum is provided with copper supports extending axially out of both of its ends for connection to the source of heating current, and with rings connected to the thermistor. An adjustably biased electronic switch controls a thyristor-type electronic switch (e.g. a triac) having a control electrode, the triac being connected in series with the heating element to control the amount of heat generated by this element.

DESCRIPTION OF THE DRAWING

The above and other objects, features, and advantages will become apparent from the following description, reference being made to the accompanying drawing in which:

FIGS. 2 and 3 are side sectional views taken in opposite directions and showing the scraper according to the present invention in contact with the cooking drum;

SPECIFIC DESCRIPTION

Figure 1:
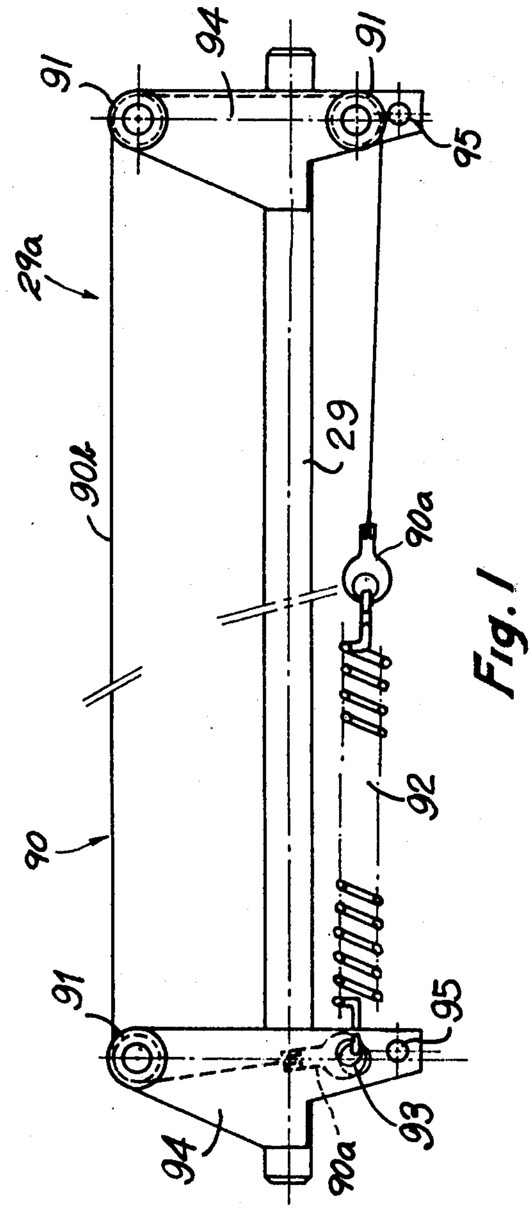
FIG. 1 is an elevational view of the scraper of the present invention.

As seen in FIGS. 1–3 the pancake-cooking machine, which in all respects not specifically described is of the types shown in U.S. Pat. No. 3,630,140, has a cooking drum 10 rotatable about a horizontal axis A in the direction shown by arrow 10*a*. This drum is, as described above, cut out at 10*b* so that it forms a single large pancake or crepe of a length equal to its surface area minus the surface of the cutout 10*b*.

The finished pancake is stripped from the drum 10 by a stripper 29*a* which is pivotal relative to the machine on a shaft 29 about a horizontal axis A' parallel to the axis A of rotation of the drum 10. This arrangement 29*a* comprises a pair of arms 94 mounted parallel to each other adjacent the ends of the pivoted shaft 29. One of the arms is provided with two small wheels or pulleys 91, and the other with a single wheel 91. A stainless steel wire 90 is spanned around the three pulleys 91 and is provided at its ends with eyes 90*a*. A tension spring 92 has one end hooked through one of the eyes 90*a* and another end hooked through the other eye 90*a* and a hole 93 formed in one of the arms 94. The wire 90 therefore has a straight stretch 90*b* that extends exactly parallel to the axes of rotation of the drum and of the pivotal stripping arrangement 29*a*. Two further tension springs 96 each have one end hooked through a hole 95 in one of the arms 94 and another end hooked at 96*a* into the fixed housing of the pancake baking machine. In this manner the straight stretch 90*b* of the wire 90 is always urged against the drum 10.

As a pancake P on the drum 10 passes the nadir of this drum the wire 90 is urged between drum surface and the baked batter and frees it from the drum. Since the only possible heat conduction through the scraper arrangement 29*a* to the rest of the machine is through the fine wire 90, very little loss of heat will result, and only a minimal heating of the scraper arrangement will occur. Since the arms 94, as best seen in FIGS. 2 and 3, lie essentially tangent to the surface of the drum 10 the force of friction between the wire 90 and the drum 10 will be exerted as a pull since the scrapper pivot 29 is arranged on the upstream side of the wire 90*b*, relative to the rotation direction of the drum 10. As a consequence, the pancake stripper operates as a draw knife.

FIGS. 4–7 show the arrangement for displacing the feed tray 13 and its transfer roller 12. This batter tray or pan 13 is slidable on a traverse 115 extending between the sides 98*a* of the machine. Riveted to each end of this traverse 115 is a leaf spring 115*a* having a split defining a normally upwardly inclined edge 115*b* directed back toward the drum 10. During use of the machine this edge 115*b* bears against the back edge of the tray 13 to hold the roller 12 in contact with the drum 10.

The pan 13 is formed to each side of its triangular reservoir with a socket 123*b* in which fits a support frame 123 made of heavy-gauge chromed steel wire of approximately 5mm in diameter, which forms a cradle for an overturned bottle 123 of pancake batter. This bottle 123*a* is open at its lower end and functions like an animal feeder to maintain a constant level of batter in the reservoir since every time the level drops air may enter the bottle 123 allowing more batter to flow out.

The synthetic-resin drive roller 12 is rotated in a rotation sense 12*a* identical to the rotation sense of the drum 10 about an axis A'' parallel to the drum axis A. This roller 12 is provided at one end with a gear 12*b* connected to a drive motor.

A heavy-gauge bent-wire control mechanism 97 is provided which is pivoted in the machine housing 98*a* about a displaceable axis A''' parallel to the drum axis A and which is normally supported on the springs 115*a* in the upper end of slots 120. To this end the mechanism 97 is formed with two downwardly depending ends 98 having bent-out portions 119 received in respective vertical slots 120 formed in the housing 98*a*. The wire 97 is also formed with two bights 97*b* which are open outwardly in opposite directions and through which the uprights 123*c* for the bottle support 123 pass. Between these supports the wire 97 is formed as a handle 97*a*. A stiffening wire 121 is soldered between the legs 98 to stiffen the bent-wire handle 97.

Figure 5:
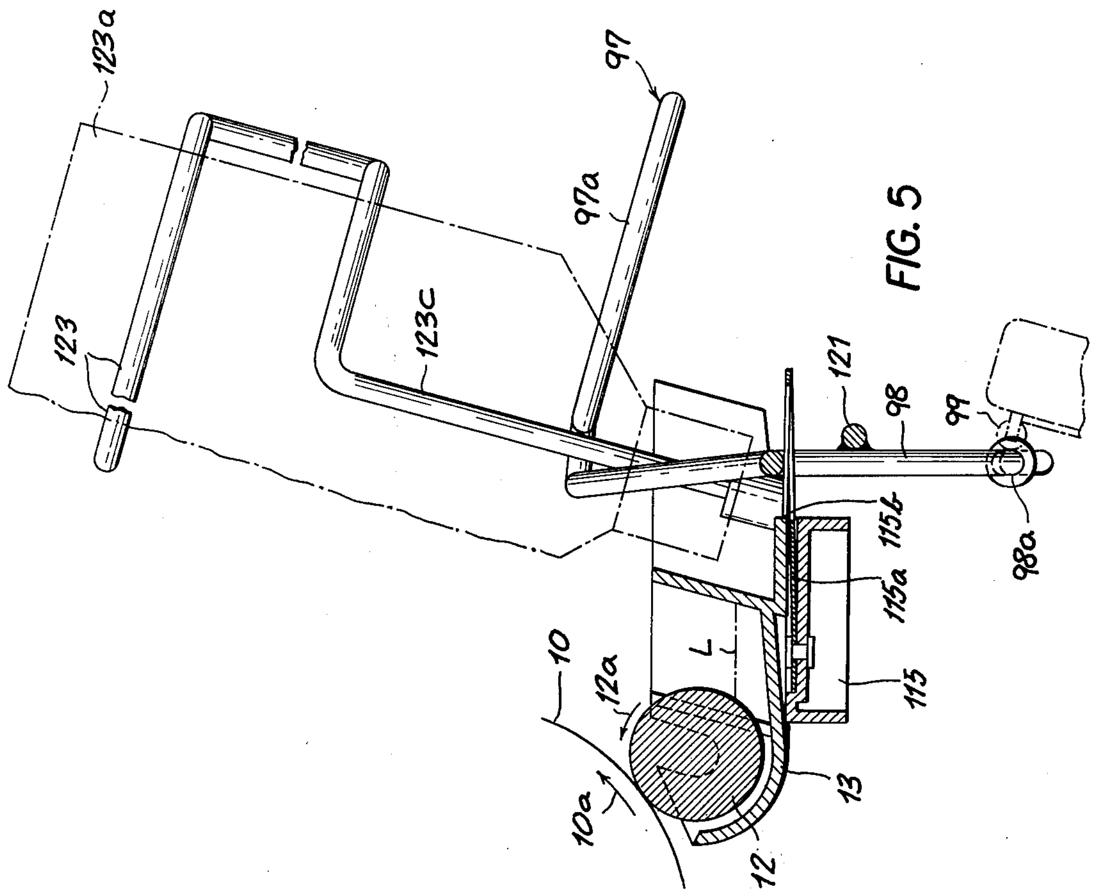
FIG. 5 is a section taken along line V—V of FIG. 4.
Figure 4:
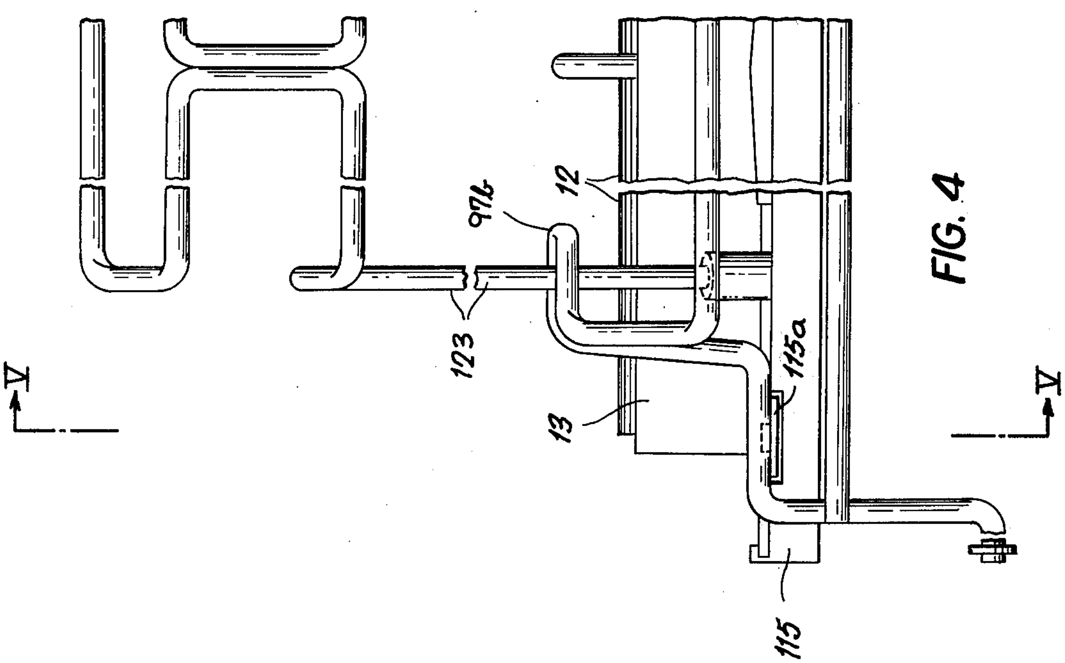
FIG. 4 is a side view of the mechanism for displacing the batter tray and the transfer roller toward and away from the cooking drum with the roller against the drum.
Figure 6:
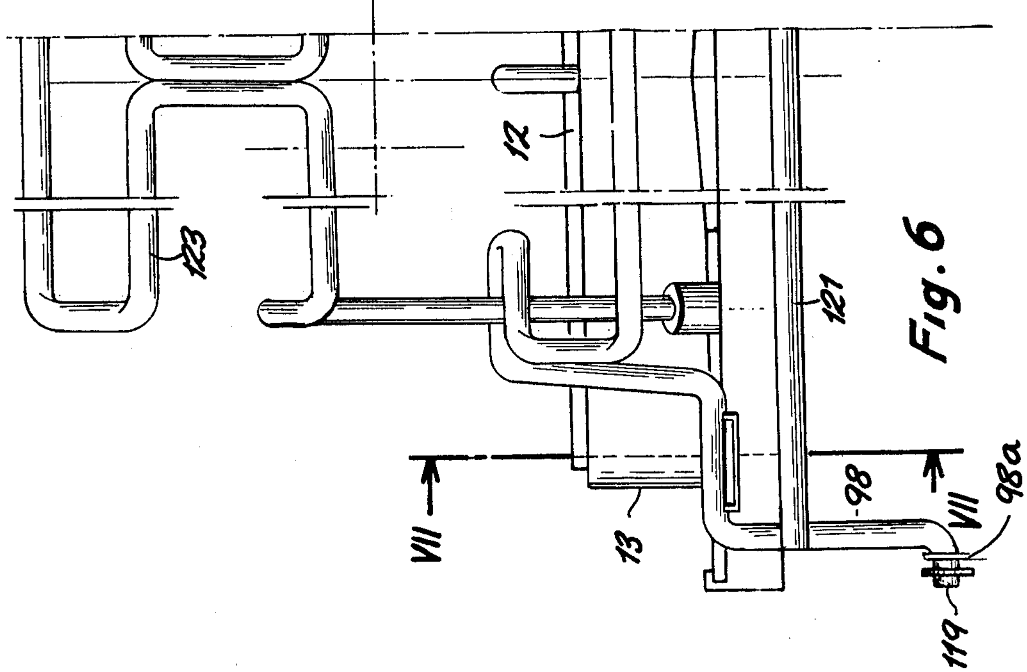
FIG. 6 is a view similar to FIG. 4 showing the tray and roller withdrawn.

The handle control 97 operates as follows:

Assuming the machine is in the position shown in FIGS. 4 and 5 and the operator desires to stop it, he need merely depress and pull back on the handle 97*a*, that is pull it away from the drum 10. Depressing this handle bends the spring 115*a* down, freeing the edge 115*b* from the tray edge. Displacement of the handle away from the drum will entrain the entire tray assembly since the bights 97*b* engage around the uprights 123*c* of the bottle support 123 which is fixed on this tray 13. The retracted roller 12 and tray 13 are shown in FIGS. 6 and 7.

The roller 12 is brought back into engagement with the drum 10 by a displacement of the handle 97*a* back toward the drum 10. The bights 97*b* again serve to push the tray 13 back, and, so long as the handle 97*a* is lifted as it is pushed in, the edges 115*b* of the leaf springs 115*a* will again catch on the back edge of the tray 13.

Figure 7:
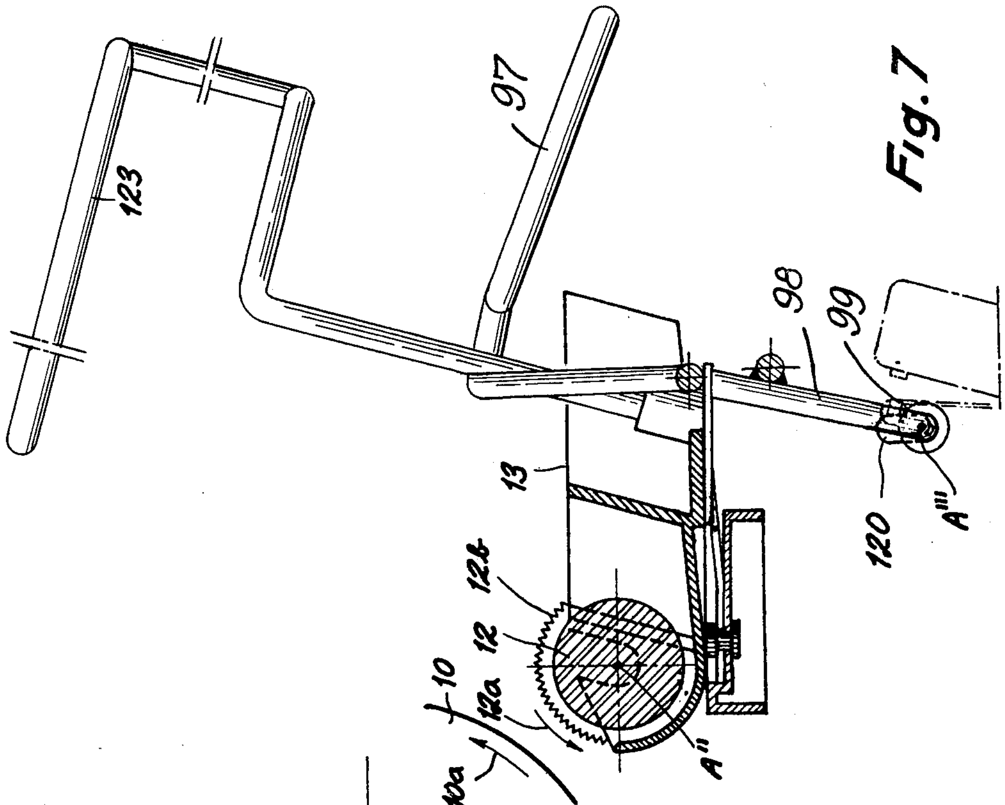
FIG. 7 is a section taken along line VII—VII of FIG. 6.

FIGS. 5 and 7 also show a microswitch (sensitive switch) 99 mounted on the machine housing 98*b* adjacent the lower end 98*a* of the arms 98. This switch 99 is connected to the machine's drive motor as will be described below. In the up position of the control assembly 97 the microswitch 99 is hled in the closed position, and in the down position it is open. Thus when the roller 12 is retracted out of contact with the drum 10 the switch is opened and these two elements terminate their rotation.

Figure 8:
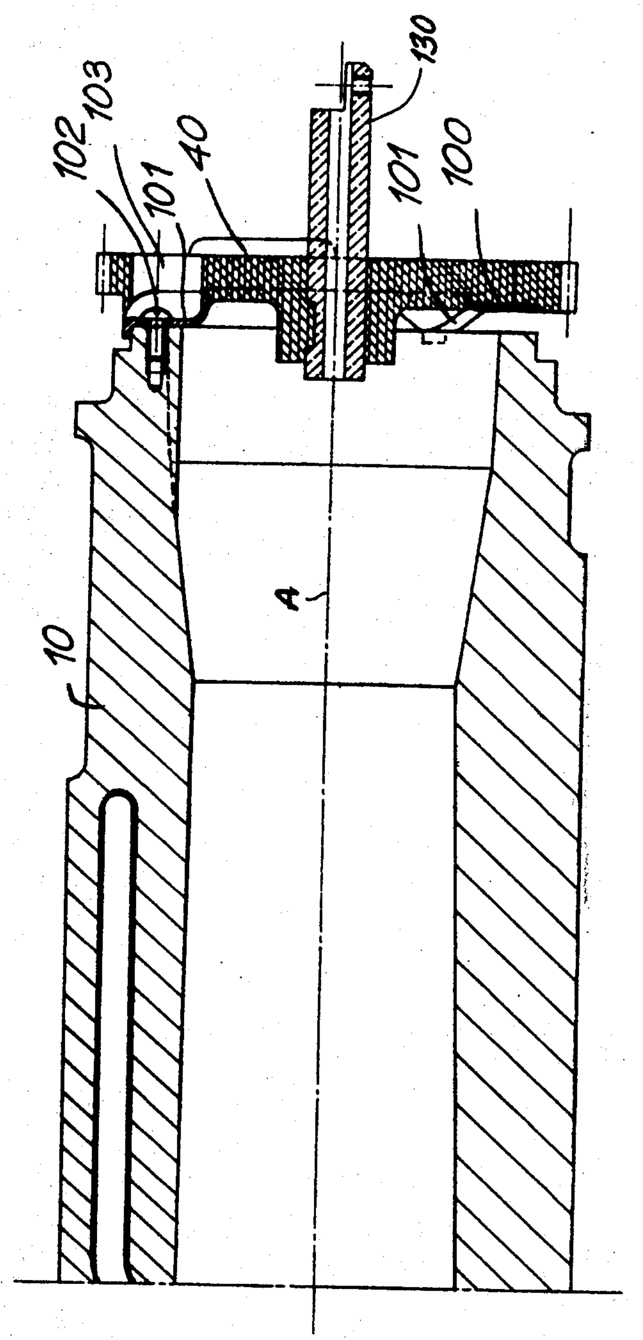
FIGS. 8 and 9 are respectively longitudinally sectional and end views of the cooking drum of the present invention.
Figure 9:
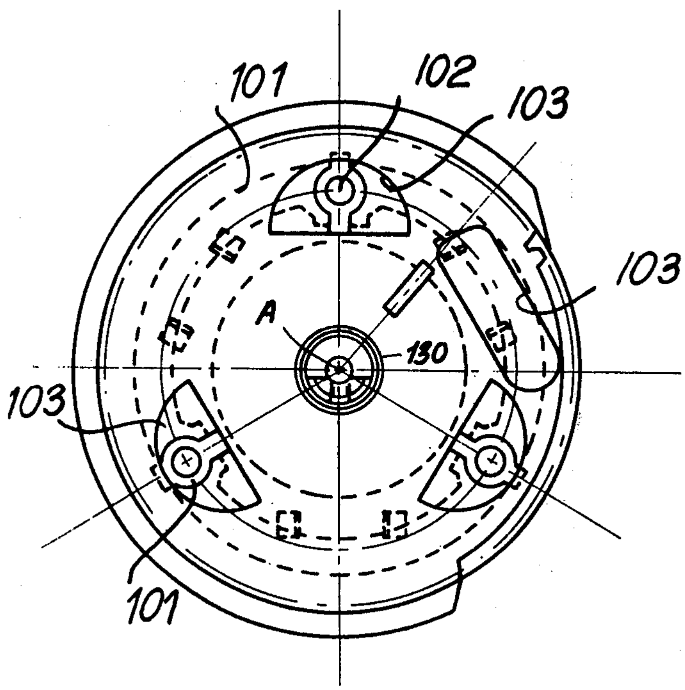

FIGS. 8 and 9 show one end of the drum 10 with its drive gear 40 which is connected to the machine's drive motor described below. This gear 40 is made of a heat-resistant thermosetting synthetic resin formed on a stainless-steel base 100 formed with bumps 101 through which it is secured by means of screws 102 to the end of the drum 10. In addition the entire gear 40 is formed with through-going holes 103 to reduce heat transmission. The base 100 is formed as a spider to further reduce heat transmission. Thus an extremely small amount of heat can be transmitted from the hot drum 10 to the drive motor through the gears. The drum 10 is supported on copper sleeves 130 coaxial about the axis A of the drum 10 and seated in the synthetic-resin gear 40 not contacting the base 100. Thus there will be also very little heat conduction to the bearings supporting the axles 130 in the machine housing.

Figure 10:
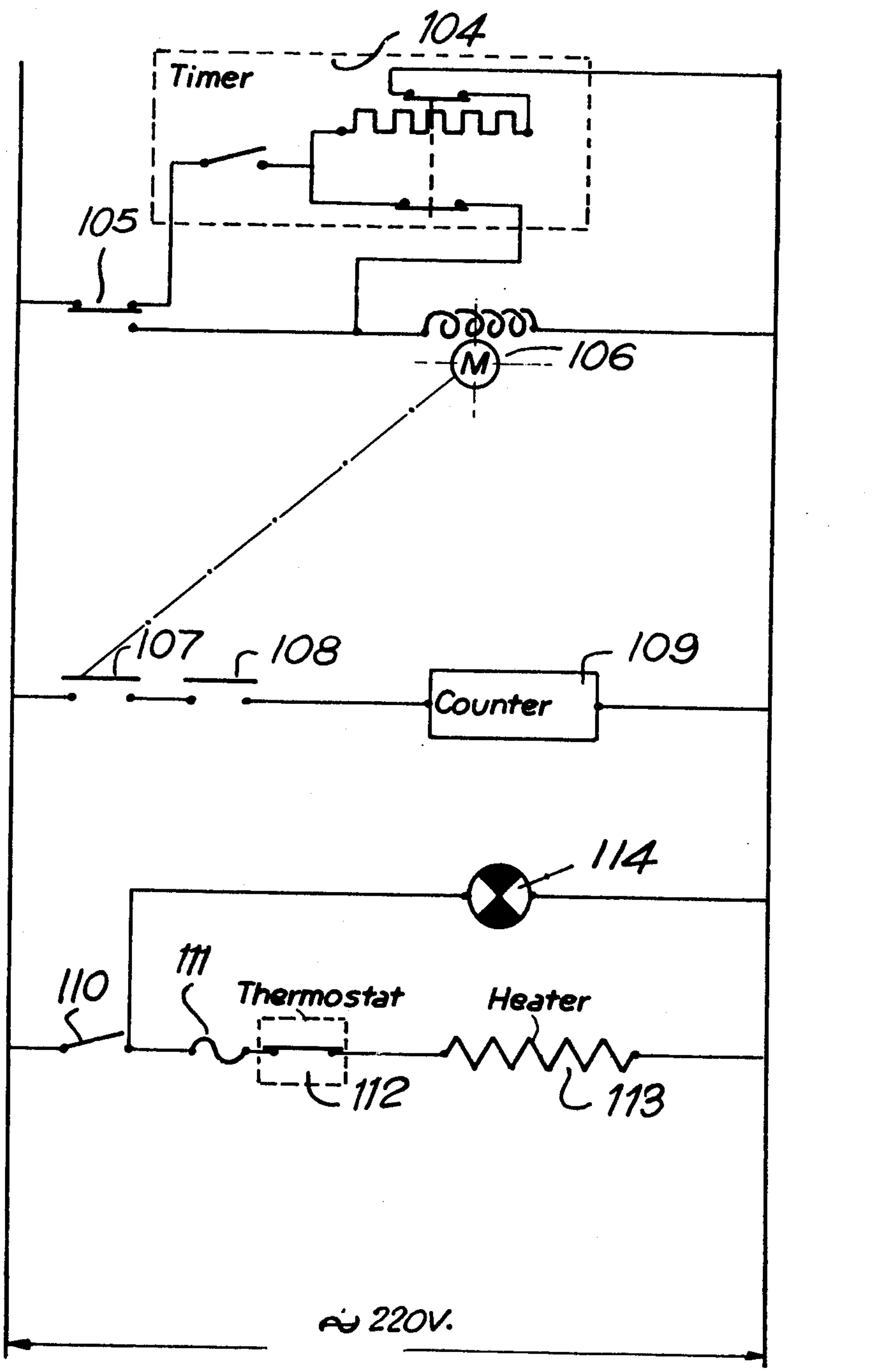
FIG. 10 is a schematic diagram of the heating arrangement according to the present invention.
Figure 12:
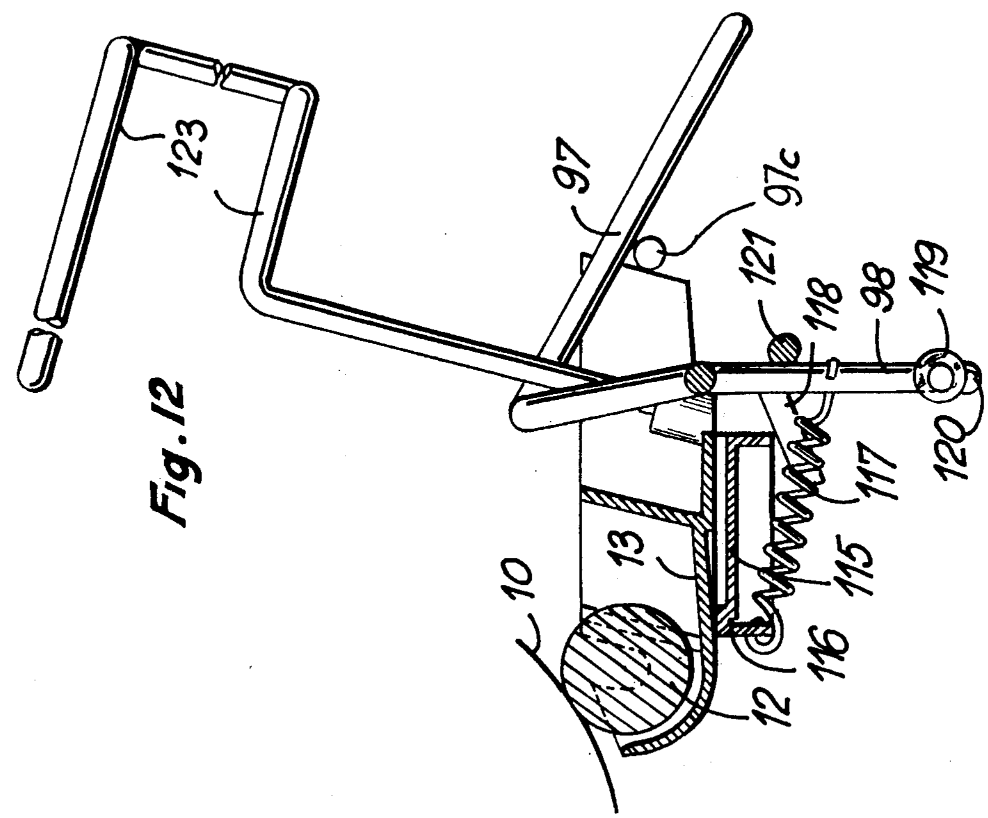
FIGS. 11–14 are views corresponding to FIGS. 4–7, with the sections of FIGS. 12 and 14 being taken along respective lines XII—XII and XIV—XIV of FIGS. 11 and 13.

FIG. 10 shows one version of the electrical control system for the arrangement. A switch 105, which can be controlled directly by the arm 98, can either operate the machine's drive motor 106 for the drum 10 and the roller 12 directly or connect the power source to a timer 104 which will operate this motor 106 for a predetermined period. Since the device makes pancakes at a uniform rate the timer can be adjustable and calibrated in pancake output rather than time intervals. Thus the device can be set to make, say, five pancakes, and will then stop.

Also connected in parallel across the line is a counter 109 and its control switches 107 and 108 which are actuated as the drum turns to count how many pancakes have been made. Thus the operator may set the machine on manual via the switch 105 and stop it with the handle 97*a* when the desired number of pancakes have been turned out.

Finally a switch controls the resistive heating element 113 imbedded in the drum 10. A thermostat 112 and a fuse 111 are connected in series with this heater, and a pilot lamp 114 is connected across it to indicate when the drum is heated up. Thus the heat is independent of the motor so that even when the device is temporarily not in use it remains ready.

Figure 14:
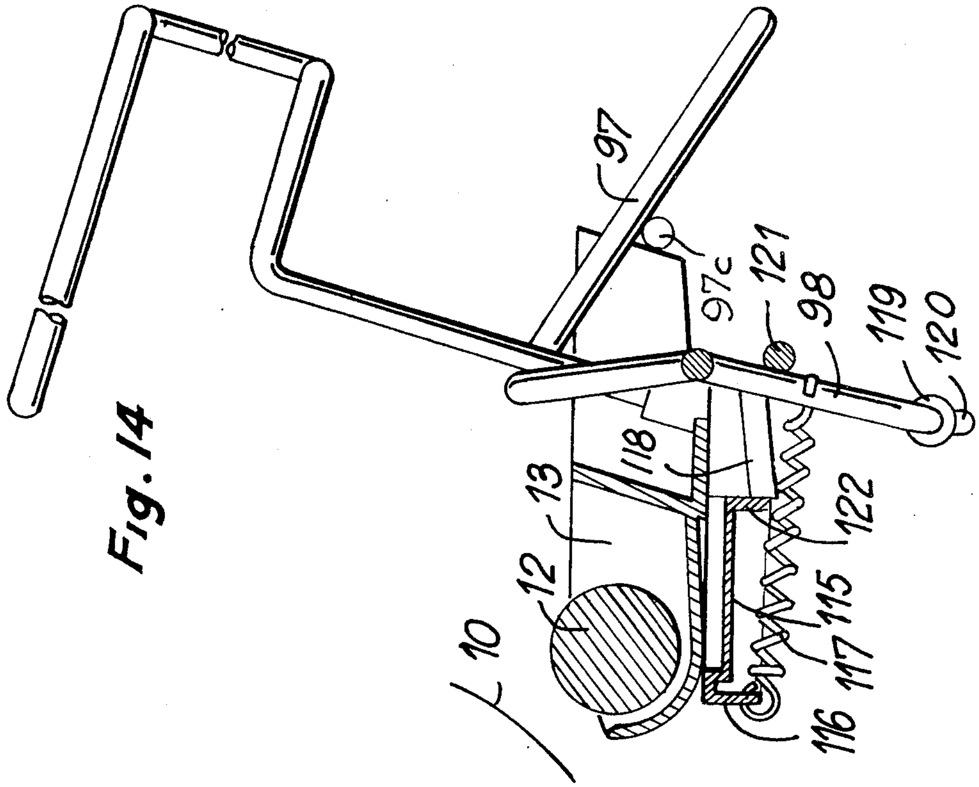
Figure 13:
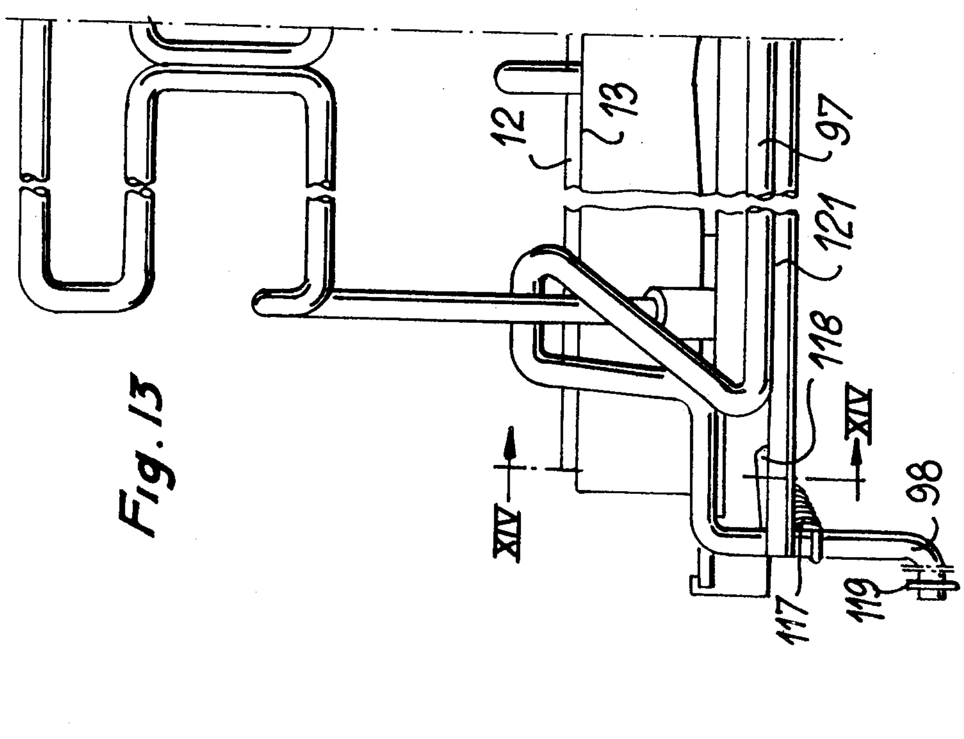

FIGS. 11–14 correspond substantially to FIGS. 4–7, with identical structure carrying identical reference numerals. Here however the handle 97 is provided on each side with a cylindrical abutment finger 118 extending toward the drum and engageable with the back 122 of the traverse 115 in the retracted position of the roller (FIGS. 13 and 14). A pair of springs 117 are each connected at one end to the front edge 116 of the inverted channellike traverse 115 and at the other end to the depending arm 98 of the handle, below the stiffening member 121 which is welded to both arms 98. In this arrangement as in FIGS. 4–7 the cage 123 can be pulled out of the sockets 123*b* in order to remove and clean the pan 13. Another wire 97*c* may be connected to the handle 97*a* in order to engage the back of the pan 13 on pushing in of the handle 97*a* to bring the roller 12 into engagement with the drum 10.

Figure 15:
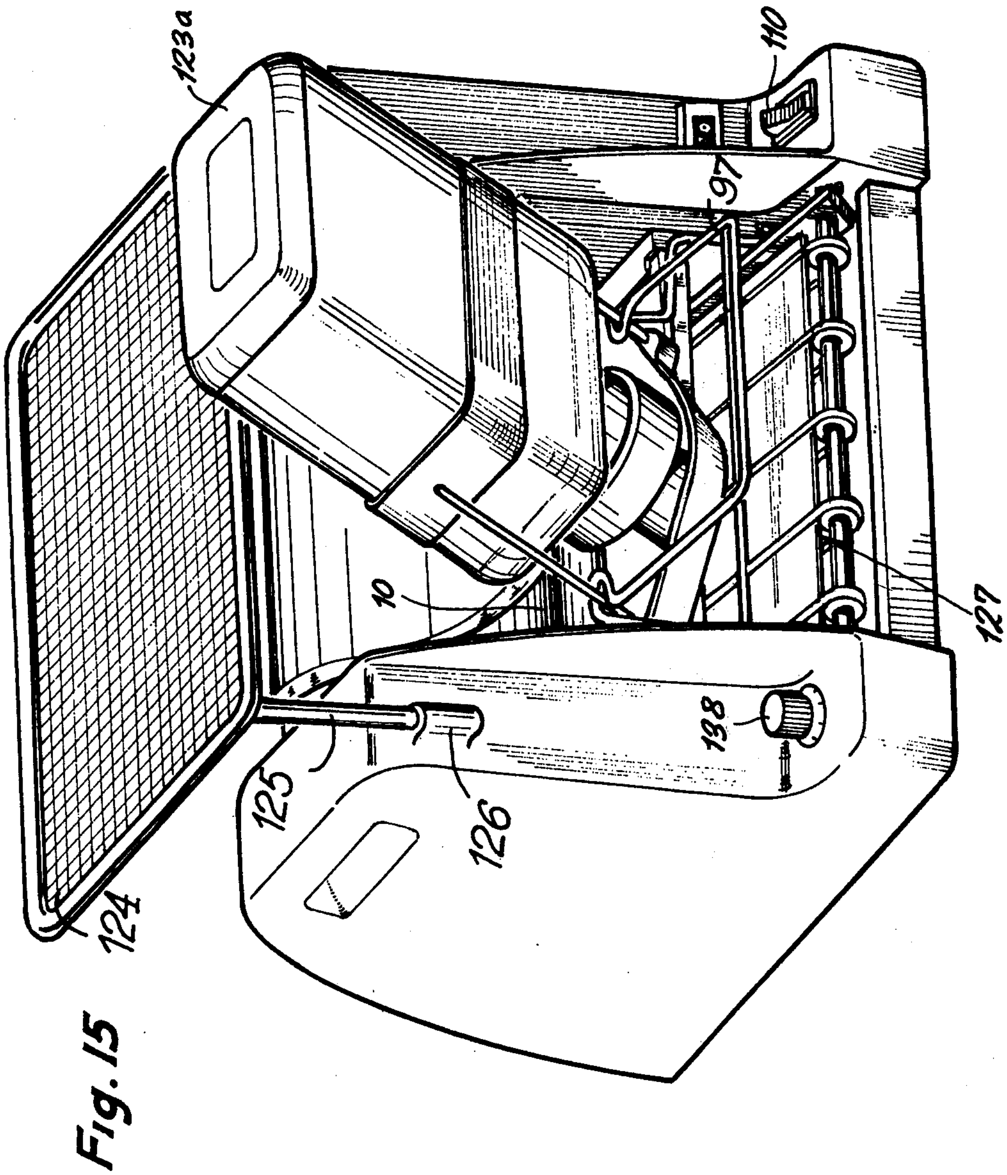
FIGS. 15 is a perspective view of the apparatus according to the present invention.
Figure 16:
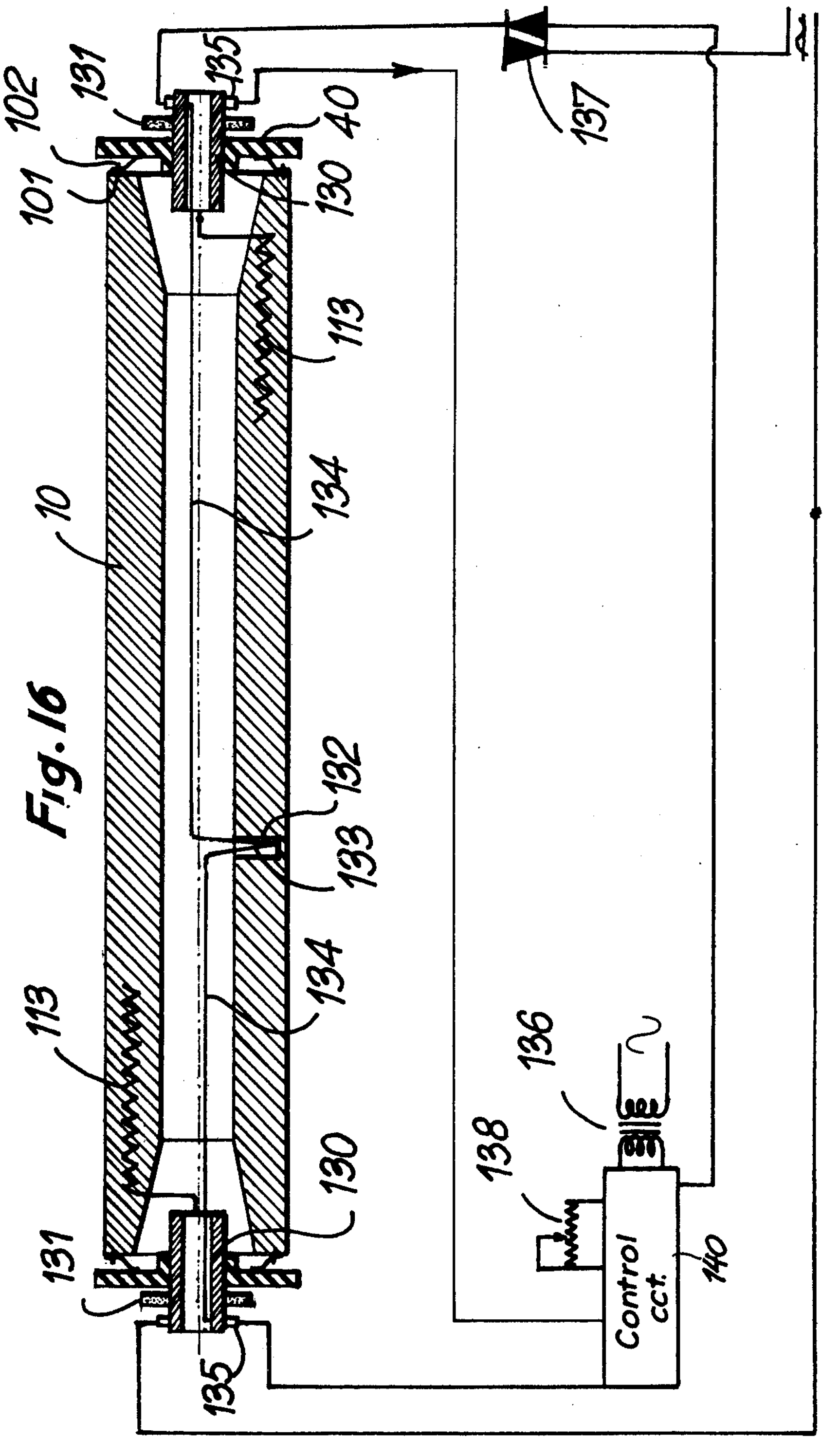
FIG. 16 is an axial section through the cooking drum of the machine, with the electrical control and power circuit shown diagrammatically.

FIG. 15 shows how the apparatus can be formed with upwardly open sockets 126 in which upright support rods 125 of a horizontal screen 124 are seated. This screen 124 is positioned directly above the hot cooking drum 10 so that finished pancakes may be stacked on it to keep them hot after production. The driven conveyor unit 127 that carries off the finished pancakes is also visible in this view.

Figure 11:
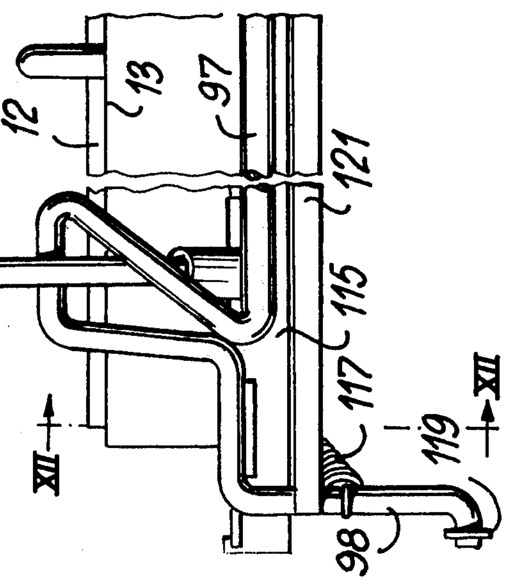

In FIG. 11 the drum 10 is shown, with the brushes 131 which conduct electricity to the heating element 113 imbedded in it. One copper axle piece 130 is connected to one sole of the power source and the other is connected through a triac 137 to the other side.

The drum 10 is hollow and is formed with a recess 132 in its interior whose base lies very close to the drum surface. A thermistor 133 is housed in this recess 132, potted in a sleeve of heat-conducting polytetrafluorethylene. This thermistor 133, which changes resistance as its temperature changes, is connected via wires to rings 135 on the axles 130, these rings being insulated from the axles 130. Thence the rings are connected by wipers to a control circuit 140 having a power source 136 and an adjustable element 138 and connected to the gate of triac 137 to regulate the amount of heating in the element 113.

Figure 17:
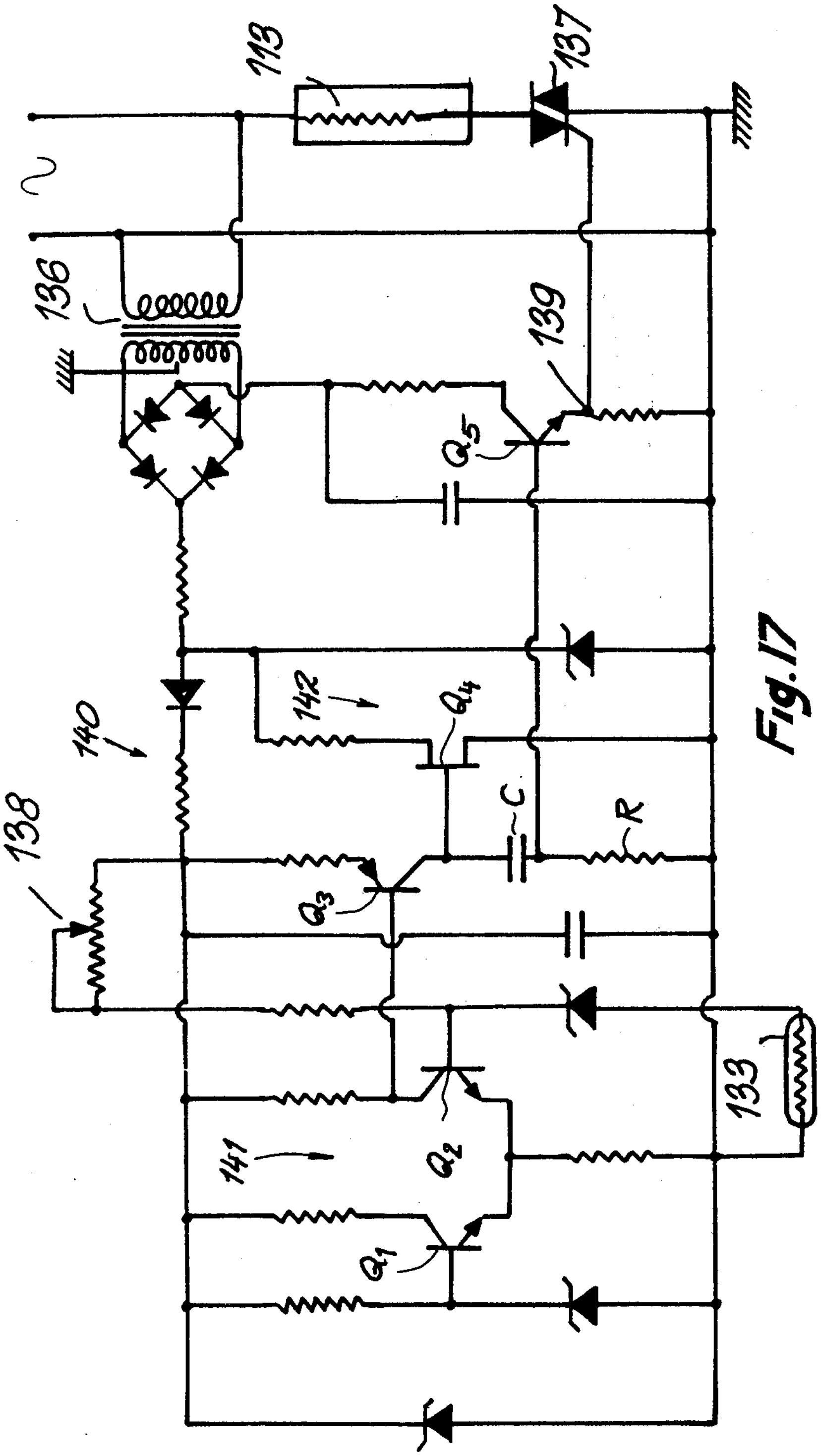
FIG. 17 is a detailed schematic view of the supply and control circuit of FIG. 16.

More specifically FIG. 17 shows how the thermistor is connected into a flip-flop 141 and is balanced by the potentiometer 138.

This circuit operates as follows: The flip-flop 141 will have an output at the collector of transistor $Q_1$ when the temperature of the drum 10 is above a predetermined level, that is when the resistance of thermistor 133 is less than the resistance of potentiometer 138. When the temperature of the drum drops and the resistance of the thermistor 133 thereby increases the other transistor $Q_2$ will have an output at its collector which will be fed via the amplifying transistor $Q_3$ to a unifunction transistor $Q_4$ arranged with a capacitor C and resistor R to operate as an oscillator 142. The output of this oscillator is fed through a final isolating transistor $Q_5$ whose emitter is connected to the gate 139. The oscillator 142 can only function when the transistor $Q_3$ is switched on, and this transistor is only switched on when the flip-flop 141 has an output at the transistor $Q_2$, so that the necessary oscillation to control the triac 137 is only obtained when the temperature of the drum 10 drops below a predetermined level, in turn determined by the setting of potentiometer 138. The cycling time of the oscillator 142 established the inertia of the heater control which is extremely sensitive to even the slightest change in resistance of thermistor 133 so that a very fine and rapid control is achieved.

Such a pancake-baking machine can make pancakes serially, with virtually no effort on the part of the operator, while producing pancakes as good as those made painstakingly by hand. The hot drum 10 serves to keep already made pancakes hot, while its heat is not transmitted through the scraper or through its support to the machine's housing. Furthermore the roller 12 remains out of contact with the drum when the device is standing by so that an accidental cooking of the batter in the reservoir is ruled out.

I claim:

1. In a pancake making machine comprising a trough adapted to receive a supply of batter, a drum rotatable adjacent said trough and formed with a continuous cylindrical peripheral surface except for an axially extending recess, a rotatable transfer roller with access to the batter in said trough closely juxtaposed with said drum, means for rotating said roller and said drum for transferring batter from said trough to said drum, means for heating said drum and baking the batter thereon, and scraper means downstream from said roller in the direction of drum rotation for removing the baked batter from said drum, the improvement wherein said drum is provided at least on one end with a drive gear comprising a metallic base plate fixed to said drum and a heat-resistant synthetic-resin gear wheel formed thereon and having teeth, said base plate being formed as a spider secured at angularly spaced bumps to said drum, said drive gear being formed with throughgoing heat-dissipating holes.

* * * * *